(12) United States Patent
Turner

(10) Patent No.: US 8,983,059 B2
(45) Date of Patent: *Mar. 17, 2015

(54) TELEPHONE INTERFACE

(71) Applicant: Bruce H. Turner, Palo Alto, CA (US)

(72) Inventor: Bruce H. Turner, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/267,819

(22) Filed: May 1, 2014

(65) Prior Publication Data

US 2014/0241521 A1    Aug. 28, 2014

Related U.S. Application Data

(63) Continuation of application No. PCT/US2012/062891, filed on Nov. 1, 2012, which is a continuation-in-part of application No. 13/288,863, filed on Nov. 3, 2011, now Pat. No. 8,306,197.

(60) Provisional application No. 61/560,962, filed on Nov. 17, 2011.

(51) Int. Cl.
| | |
|---|---|
| *H04M 1/00* | (2006.01) |
| *H04M 9/00* | (2006.01) |
| *H04Q 1/02* | (2006.01) |
| *H04M 1/725* | (2006.01) |
| *H04M 1/738* | (2006.01) |

(52) U.S. Cl.
CPC ........... *H04Q 1/028* (2013.01); *H04M 1/72527* (2013.01); *H04M 1/72536* (2013.01); *H04M 1/738* (2013.01)
USPC .................................................... 379/413.02

(58) Field of Classification Search
USPC ..................................................... 379/413.02
See application file for complete search history.

(56) References Cited

U.S. PATENT DOCUMENTS

| | | | |
|---|---|---|---|
| 6,002,937 A | 12/1999 | Young et al. | |
| 6,256,518 B1 | 7/2001 | Buhrmann | |
| 7,376,221 B1 | 5/2008 | Remy et al. | |
| 2002/0106994 A1 | 8/2002 | Payne et al. | |
| 2004/0218583 A1* | 11/2004 | Adan et al. | ..... 370/352 |
| 2007/0281616 A1 | 12/2007 | Chen | |
| 2011/0103576 A1 | 5/2011 | Partington | |
| 2011/0171940 A1 | 7/2011 | Dinur | |

OTHER PUBLICATIONS

International Preliminary Report on Patentability, PCT/US2012/062891, Feb. 27, 2014, IPEA/RU.
Panasonic KX-TG7875S (photograph of product packaging re: bluetooth use acknowledged to predate priority).
Panasonic KX-TG7875 Operating Instructions.

* cited by examiner

*Primary Examiner* — Alexander Jamal
(74) *Attorney, Agent, or Firm* — Raymond E Roberts; Intell. Prop. Venture Group

(57) ABSTRACT

An apparatus (100, 200) for interfacing between an external telephone (12) and telecommunications network (24), wherein the telephone provides and accepts subscriber-side signals (126, 216) and the telecommunications network provides and accepts provider-side signals (132). A control circuit (150) and a first port (110) communicating the subscriber-side signals with said control circuit and a second port (116) communicating the provider-side signals with said control circuit. The control circuit converts the subscriber signals to the provider signals, and the provider signals to the subscriber signals.

20 Claims, 10 Drawing Sheets

(prior art, circa 1890)

|  | 1209 Hz | 1336 Hz | 1447 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | * | 0 | # | D |

FIG. 6a
(TBL. 1)

| Event | Low f | High f | Cadence / sec |
|---|---|---|---|
| Dial tone | 350 Hz | 440 Hz | Continuous |
| Ring signal | 440 Hz | 480 Hz | 2.0 on, 4.0 off |
| Busy signal | 480 Hz | 620 Hz | 0.5 on, 0.5 off |

FIG. 6b
(TBL. 2)

TELEPHONE INTERFACE

CROSS-REFERENCE TO RELATED APPLICATIONS

This is a continuation of International Application No. PCT/US2012/062891, filed 01 Nov. 2012; wherein said International Application is a continuation-in-part of U.S. application Ser. No. 13/288,863, filed 03 Nov. 2011, which issued as U.S. Pat. No. 8,306,197 on 06 Nov. 2012; and wherein said International Application also claims the benefit of U.S. Provisional Application No. 61/560,962, filed 17 Nov. 2011, which is now expired; all hereby incorporated by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUMITTED ON A COMPACT DISC

Not applicable.

BACKGROUND OF THE INVENTION

1. Technical Field

The present invention relates generally to telephonic communications, and more particularly to terminal interface circuitry.

2. Background Art

On Sep. 8, 2011 and into the morning of September 9, an electric power failure affected the lives of approximately five million people across southwestern Arizona, San Diego and adjacent areas in California, and northwestern Mexico. The cities of San Diego and Tijuana bore the brunt of this disaster, which started slightly before 4 p.m. PDT and the beginning of a Thursday evening commuter rush hour.

In San Diego, Calif. 13 police stations were left without power but were able to continue operating and taking 911 calls by using generators. In southern Orange County, Calif., the sheriffs department dispatched deputies to busy intersections because traffic lights were out. Essentially all of the traffic lights in Tijuana, Mexico were also out. As evening progressed street lights in San Diego and Tijuana stayed dark and gas stations were unable to pump gas. In Tijuana, power was cut to hospitals and government offices. In the affected areas of Arizona and California, hospitals operating their own power sources generally faired well, even with having to handle increased patient loads due to auto accidents and heat related medical emergencies (temperatures were un seasonal, with highs in much of the affected area ranging from 100° F. to 118° F.).

Of particular relevance here, as MSNBC euphemistically reported, "mobile phone networks were spotty." In the days following September 8$^{th}$ users of Professor Piggington's Econo-Almanac blog reported their own observations:

TMobile voice and data worked in most [but not all] areas. I use TMobile and it barely worked. I would be able to dial out and then it would quit.

Cell coverage (Verizon) was less than wonderful in the late afternoon. I assume because everyone was calling everyone else to say they were stuck in traffic . . . . Cell coverage was fine in the evening.

ATT worked on our i-Pad, but very slow. Went down a couple of times, then worked again.

AT&T service on unlocked non-smart phone worked until about 5:45 p.m. yesterday, then displayed "No Network Coverage" until this morning.

One blog commenter, signing as "CE," summed up this event as a learning experience (misspelling in the original):

So there are a couple of things that are good to know.

One.

Land Line systems have thier own power supply. The system is on a large battery bank and the generators are required, by FCC mandate, to have several days worth of fuel to support.

Two.

Most cell sites, now, have six hours of battery back up but sometime this won't go six hours due to extremly large loads at the cell.

Three.

Here is the stupid part. Some cell sites have fiber to them instead of T1s. While the FCC mandated that the cell sites has 6 hours of battery back up the fiber converter that translate DS0s only has two hours. So the site could keep going except its backhaul has dropped off. Mean while . . . . Like I said earlier cell sites that are connected via T1s should remain up for the duration of the cell sites batteries.

Four.

VoIP systems will fail because you do not have a local power supply. IDCs will have power, the same way that local land line switchs do, and the connection is still there but the local reciever (modem) will not have power . . . .

The above event was not unique, even in North America. For example, in 2008 a blackout in southern Florida affected 4.5 million customers for hours. The biggest blackout in the U.S. occurred on Aug. 14, 2003, disrupting power in eight U.S. states and Ontario, Canada. Over 55 million people were affected, with service in major cities, such as New York and Toronto, not fully restored for two days.

One thing that has changed since 2003 and even 2008, however, is the increasing usage of mobile telephones and the degree of reliance that out society places on these. The 2003, 2008, and 2011 events serve to illustrate that we have an existing and growing problem in our telecommunications infrastructure.

[In the following, reference numbers are used to denote generic or collective elements, and reference numbers with letter suffixes are used to denote specific elements or types of elements. For example, telephones 12, generic, versus a POTS telephone 12a and cell phones 12d, specific.]

FIGS. 1a-b (background art and prior art, respectively) depict a very basic telecommunications network 10, wherein FIG. 1a is a block diagram showing network elements and FIG. 1b is a stylized depiction of these network elements in use. The telecommunications network 10 here comprises two telephones 12a-b connected by a communications channel 14.

FIG. 2 (background art) depicts a slightly more sophisticated but still rather basic telecommunications network 10. Here two telephones 12a-b are connected to respective subscriber sub-channels 16a-b, that in turn connect to respective aggregation nodes 18a-b, which are connected by an inter-provider sub-channel 20.

Many labels in telecommunications have become obsolete. For example, subscriber sub-channels 16 have often been termed "local loops," "landlines," and the "last mile," due to the historic use of analog signals in copper wire pairs in pole supported cables connected to necessarily nearby aggregation nodes 18. Today these labels are too limiting (e.g., for cellular telephone service). Similarly, aggregation nodes 18 have often been termed "central offices" or "switches," due to the historic use of switches located at telephone service provider offices. Today these labels are also too limiting (e.g., field-located digital loop carrier (DLC) units and serving area interfaces (SAI)). Also similarly, inter-provider sub-channels 20 have often been termed "trunk lines," due to the historic use of multi-conductor cables or lines. Today that label as well is too limiting (e.g., satellite links). In general, the use of historic but obsolete labels is avoided herein.

In telecommunications today, hundreds of millions of telephones 12 and their respective subscriber sub-channels 16 are serviced by hundreds of thousands of aggregation nodes 18, that in turn are connectable with tens of thousands of inter-provider sub-channels 20. At the end of 2009 there were nearly 6 billion mobile and fixed-line subscribers worldwide, comprising 1.26 billion fixed-line subscribers and 4.6 billion mobile subscribers. (John, Richard R., Network Nation: Inventing American Telecommunications, Harvard University Press, 2010).

FIG. 3 (background art) depicts three representative communications examples in a modern telecommunications network 10. In the first example, telephones 12a-b are connectable via a first communications channel 14a. For the sake of this discussion let us say that we have a real estate broker in a small office in rural North America who is calling her home a few blocks away, to leave a message for her children.

The telephones 12a-b here are respectively connected via subscriber sub-channels 16a-b to a single aggregation node 18a. The office telephone 12 here is a plain old telephone service (POTS) type device (POTS telephone 12a), and it is especially notable here for two reasons. First, subscriber-side POTS telephones 12a are provider-side powered (e.g., from the aggregation node 18a here). Second, signals between a POTS telephone 12a and an aggregation node 18a are analog.

In contrast, home telephone 12 here is a common cordless telephone 12b having a base station portion and a hand set portion that intercommunicate using radio frequency signals. The base station portion is powered from a small plug-in transformer, that in turn is powered with building mains power from a wall outlet. The hand set portion is portable and is powered from an internal battery, which is recharged when the hand set portion is placed in the base station portion. The radio frequency signals used may be analog or digital. Nonetheless, it is analog signals that are used between the cordless telephone 12b and at least part of the way to the aggregation node 18a.

[Telephone service via coaxial and fiber optic cables are special cases where analog-digital conversion is made, usually where the service enters the premises, and the signals onward to the aggregation node are digital. Service such as this is increasingly common where households have combined cable TV, Internet, and telephone combination service. However, such telephone service is not particularly germane here.]

Continuing, the subscriber sub-channels 16a-b here are both traditional copper wire pairs connected to the local aggregation node 18a.

In the second example in FIG. 3, telephones 12a, 12c are connected via a second communications channel 14b. Continuing with our hypothetical real estate broker, let us now say that she calls the hotel room of clients who are vacationing in Europe, to inform them that an offer they made on a property has been accepted. Proceeding from left to right, the office POTS telephone 12a connects via the subscriber sub-channel 16a to the local aggregation node 18a; the aggregation node 18a connects via inter-provider sub-channel 20a to the aggregation node 18b; the aggregation node 18b connects via inter-provider sub-channel 20b to the aggregation node 18c; the aggregation node 18c connects via inter-provider sub-channel 20c to the aggregation node 18d; the aggregation node 18d connects via inter-provider sub-channel 20d to the aggregation node 18e; and the aggregation node 18e connects via subscriber sub-channel 16c to the hotel room telephone 12 here, which is a Voice over Internet Protocol device (VoIP telephone 12c).

The POTS telephone 12a, subscriber sub-channel 16a, and aggregation node 18a have already been discussed, and the elements between aggregation node 18a and aggregation node 18e are not particularly germane here. The VoIP telephone 12c here is notable for two reasons. First, VoIP telephones 12c are subscriber-side powered, usually from a local interface device like a router that receives building power. Second, signals between VoIP telephones 12c and aggregation nodes 18e are entirely digital.

In the third example in FIG. 3, telephones 12c, 12d are connected via a third communications channel 14c. Continuing now with our hypothetical European vacationers, let us say that the husband receives the real estate agent's call but that his wife is away from the hotel shopping. He therefore uses the hotel room's VoIP telephone 12c to call her cell phone 12d to inform her of the offer acceptance. The VoIP telephone 12c accordingly connects via the subscriber sub-channel 16c to the local aggregation node 18e; the aggregation node 18e connects via inter-provider sub-channel 20e to aggregation node 18f; and the aggregation node 18f connects via subscriber sub-channel 16d to the cell phone 12d.

The VoIP telephone 12c, subscriber sub-channel 16c, and aggregation node 18e have already been discussed, and the inter-provider sub-channel 20e here is also not particularly germane. The cell phone 12d here is battery powered, with the battery being rechargeable via a universal serial bus (USB) port in the cell phone 12d. Intercommunication here over the subscriber sub-channel 16d is via radio waves.

FIG. 4 (background art) is a simplified version of FIG. 3, with some pertinent information added and some minor changes made to facilitate discussion. For present purposes, everything between the aggregation nodes 18 here is presented as generic inter-provider sub-channels 20 connecting with a central cloud 24. FIG. 4 depicts the cellular aspects of the telecommunications network 10 slightly different than in FIG. 3. Here everybody has a cell phone 12d and there are ubiquitous sets of cellular aggregation nodes 18f. Also, for completeness and later discussion a generic power source 26 is depicted.

FIG. 4 serves now to discuss some generalizations about the history of telephony. Today we have, plain old telephone service (POTS), public switched telephone network (PSTN) service, and cellular service all coexisting and in wide use. The POTS telephone 12a, the cordless telephone 12b, and the subscriber sub-channels 16a-b here employ what is widely termed "POTS technology." The VoIP telephone 12c, the subscriber sub-channel 16c, and the aggregation node 18e employ digital Internet Protocol (IP) technology. The cell phones 12d, the subscriber sub-channel 16d, and the aggregation nodes 18f employ radio based digital "cellular technology." Additionally, the aggregation nodes 18b-f, the inter-provider sub-channels 20, and the cloud 24 employ digital "PSTN technology" or Internet Protocol (IP) technology, with the aggregation nodes 18 typically interfacing between respective technologies as needed.

Generalizing, POTS technology is analog and PSTN technology is digital. Starting in the early 1960's, analog POTS in the telecommunications network 10 started to be converted over to digital PSTN, and digital IP and cellular technologies subsequently followed. The process of analog to digital equipment conversion is near complete, except for some telephones 12 and subscriber sub-channels 16. In the interest of backwards compatibility, many local aggregation nodes 18 still can handle analog POTS communications. POTS and PSTN services were historically subject to different political considerations than the newer cellular and VoIP services. POTS grew during the early years of the cold war, PSTN grew during the later years of the cold war, and cellular and VoIP have grown in the post cold war era.

POTS and PSTN were viewed as critical national infrastructure. Few today remember when POTS was the only service available. In contrast, many today appreciate that the Internet was developed adjacent with and melded with PSTN. The widely accepted notion that the Internet was designed to survive a nuclear attack serves to emphasize just how robust most POTS and PSTN services were and continue to be designed. Also, POTS and PSTN largely necessitated monopolies for their efficient operation, and governments therefore dictated many aspects of design and strongly regulated the major market participants.

In contrast, cellular and VoIP technologies have grown largely as parallel options to POTS and PSTN in most places, and these technologies do not necessitate monopolies. Governments have therefore not generally had the justification or motivation to dictate design or regulate market participants.

Turning now particularly to cellular technology, the overwhelming considerations for it have been lowest pricing and newest features. Today cell phones 12d are often given away to subscribers in exchange for 1-2 year service contracts and the life cycle of a cell phone, from design through to obsolescence, can be as little as two years.

Over the shorter history of cellular service, some aspects of cell phones 12d have and continue to become standardized. For example, the rightmost cell phone 12d in FIG. 3 was described above as being a "smart phone," with a USB port that doubles as a power connection port. This power arrangement has become largely standard for all new cell phones 12d today. Similarly, many new cell phones 12d use hardware (e.g., digital signal processors) and software (e.g., the Android™ operating system) that permit very flexible yet powerful software applications. For instance, a Motorola Droid™ device inherently has radio frequency coverage for cellular bands, Wi-Fi, and Bluetooh™, but can be programmed to handle essentially any protocol that uses the same or close radio frequencies. Moreover, while cellular telephone programming historically has required considerable specialized talent and entailed substantial learning of the target device, the emerging use of standard operating systems (e.g., Google's Android™ OS) increasingly permits those with barely any programming talent to create their own software applications in a few hours.

The overwhelming consideration for VoIP service has been very low cost of operation. Aside from an initial equipment investment, VoIP is almost free and its cost is not tied to the amount of usage. Today VoIP telephones 12c are increasingly common in business environments, because most business have Internet connectivity and are motivated to minimize operating costs. Nonetheless, some recently variations of VoIP have become popular with travelers and in home environments. Probably the two most well known of these are Skype™ and MagicJack™.

Skype™ is a software application that allows users to make voice and video calls and chat over the Internet. Calls to other users within the service are free, while calls to traditional POTS/PSTN telephones and cell phones can be made for a fee. Many subscribers are business travelers who use laptop or tablet computers to make economical long distance calls. If a computer or computerized device has a microphone and a speaker it can likely be used. Alternately, handsets or head sets that plug into a USB port of a computer or computerized device can be bought for use with the service.

MagicJack is a device that plugs into a USB port on a user's computer and that has a standard RJ-11 phone jack into which any standard POTS/PSTN telephone can be plugged. The User's computer must have Internet access, but then is able to make calls to almost any phone in the U.S. and Canada.

Changing tact now, let us consider how the telecommunications network 10 in FIG. 4 can fail. Failures can generally be classified as equipment breakdown, equipment overload, and underlying infrastructure failure.

Equipment breakdown is straightforward. One can minimize this by building more robust equipment or one can mitigate this by providing redundancy. In the case of the cloud 24, both approaches are widely employed. The cloud 24 can be spoken of as being a part of, as itself being, or as including the Internet, and it can be recalled here that the Internet was purportedly designed to withstand nuclear attack.

In contrast, telephones 12 vary considerably in their resistance to breakdown. Some are wonders of robustness, whereas others breakdown easily. Many older style POTS telephones 12a are very robust, largely due to their original design having occurred when redundancy was rare and expensive (e.g., a telephone was a substantial investment, often leased from the TelCo on a monthly basis), and one telephone per home was felt sufficient. Business telephones 12 (e.g., VoIP telephone 12c) are typically next in robustness, largely due to businesses being willing and able to pay for increased reliability, and seeking to reduce operating costs. Modern household telephones 12 (e.g., cordless telephone 12b) are usually another matter. These are widely regarded as a cheap commodity and they are typically replaced every 2-3 years, if for no other reason than that consumers want newer features. Portable telephones 12 (e.g., cell phones 12d) are generally the most subject to breakdown. This is due partly to their inherently being subject to a higher level of abuse. Regarded also as a cheap commodity, these are also usually expected to only last 1-2 years, until a replacement is obtained with a new service agreement or until a superseding model with newer features becomes available. In passing here, it should also be noted that cordless telephones 12b and cell phones 12d have batteries that can completely discharge (effectively resulting in a temporary breakdown) or that can literally breakdown. As FIG. 4 indirectly implies, we now have a considerable amount of redundancy in telephones 12 today, particularly due to cell phones 12d becoming essentially ubiquitous in modern society.

Subscriber sub-channels 16 also vary considerably in their resistance to breakdown. Suffice it to say that what can reasonably be done to make these more robust usually is done. As for redundancy, subscribers can pay for multiple lines, but adjacent subscriber sub-channels 16 tend to fail together (e.g., by a commonly used cable being cut).

The resistance to breakdown of local aggregation nodes 18 (e.g., aggregation nodes 18a, 18e, 18f) also varies. A lot of the "survive nuclear attack" design is still found in almost all non-cellular type aggregation nodes 18, and even smaller, local instances are usually robustly built with considerable internal redundancy. In the United States and many other countries, non-cellular aggregation nodes 18 are usually battery powered, with charging systems that have at least one back-up power source. Back-up generators and fuel supplies that will last at least for hours are mandated by government regulations.

Aggregation nodes 18 for cellular service are often markedly different. In a cellular scheme each local node is often part of an overlapping grid. If one breaks down, others may be able to seamlessly cover. Additionally, lulled into a sense of security because POTS and PSTN widely coexist, consumer concern and government involvement is often considerably less here. Notably, where there are government regulations requiring back-up generators, the requirements for fuel supplies are lower than such for non-cellular aggregation nodes 18.

Continuing with how the telecommunications network 10 in FIG. 4 can fail, equipment overload is a rapidly growing but underappreciated possibility. POTS and PSTN services generally have much higher resistances to overload than cellular services. The history of POTS and PSTN as critical communications infrastructure, and close government design and regulatory involvement, have resulted in these having high capacity to subscriber ratios. For instance, if there is a natural or man-made disaster and 10% of POTS or PSTN subscribers concurrently attempt to make calls, most if not all will get a dial tone, be able to enter a telephone number, and be able to call across the street or around the world. In contrast, if there is a similar disaster and 10% of cellular subscribers concurrently attempt to make calls, the cellular services will likely overload or outright crash.

Continuing further with how the telecommunications network 10 in FIG. 4 can fail, we come to underlying infrastructure failure. In general, this means power failure.

The older style POTS telephone 12a fairs best here. It is line powered, meaning that it receives all necessary power for operation from its local aggregation node 18, via copper wires in the subscriber sub-channel 16. The cell phone 12d also tends to fair well when the electric power goes off. It is, however, subject eventually to battery depletion, say from repeated unsuccessful attempts to get through on an overloaded cellular service.

The cordless telephone 12b and the VoIP telephone 12c do not fair at all here, at least not without a backup power source (which is uncommon and in some cases simply will not help anyway). Recall that cordless telephones 12b and the VoIP telephones 12c employ local power sources, such as standard wall power outlets.

Accordingly, in view of our increasing reliance on easily disrupted power sources for localized telephone communications, what is needed is a mechanism to decrease such reliance. In particular, in view of the advantageous power-related features of analog POTS and PSTN technologies and the disadvantageous fact that consumer's digital telephonic-capable devices today cannot utilize such power-related features, such a mechanism should permit consumer's digital telephone devices to interface with provider's analog telephone services.

BRIEF SUMMARY OF THE INVENTION

Accordingly, it is an object of the present invention to provide an interface between signals at a telephone and signals at a telecommunications network.

Briefly, one preferred embodiment of the present invention is an apparatus for interfacing a telephone with a telecommunications network wherein the apparatus is external to both the telephone and the telecommunications network. The telephone provides and accepts subscriber-side signals that include subscriber-side control content and subscriber-side voice content. The telecommunications network provides and accepts provider-side signals that include provider-side control content and provider-side voice content. The apparatus includes a control circuit, a first port to communicate the subscriber-side signals with th control circuit, and a second port to communicate the provider-side signals with the control circuit. The control circuit converts the subscriber-side control content to the provider-side control content, and converts the provider-side control content to the subscriber-side control content. The control circuit also converts the subscriber-side voice content to the provider-side voice content, and converts the provider-side voice content to the subscriber-side voice content.

Briefly, another preferred embodiment of the present invention is a method for interfacing a telephone with a telecommunications network. The telephone provides and accepts subscriber-side signals that include subscriber-side control content and subscriber-side voice content. The telecommunications network provides and accepts provider-side signals that include provider-side control content and provider-side voice content. The method provides a control circuit that is external to both the telephone and the telecommunications network. The method communicates the subscriber-side signals with the control circuit, communicates the provider-side signals with the control circuit. And the method, in the control circuit, converts the subscriber-side control content to the provider-side control content, converts the provider-side control content to the subscriber-side control content, converts the subscriber-side voice content to the provider-side voice content, and converts the provider-side voice content to the subscriber-side voice content.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures and tables of drawings in which:

FIGS. 1a-b (background art and prior art, respectively) depict a very basic telecommunications network, wherein FIG. 1a is a block diagram showing network elements and FIG. 1b is a stylized depiction of these network elements in use.

FIGS. 6a-b show tables, wherein FIG. 6a includes TBL. 1 and FIG. 6b includes TBL. 2, and wherein TBLS. 1-2 show the dual-tone frequencies conventionally used in North American telephony to represent telephone numbers and various other standardized signals.

Figure 1A:
Figure 1B:
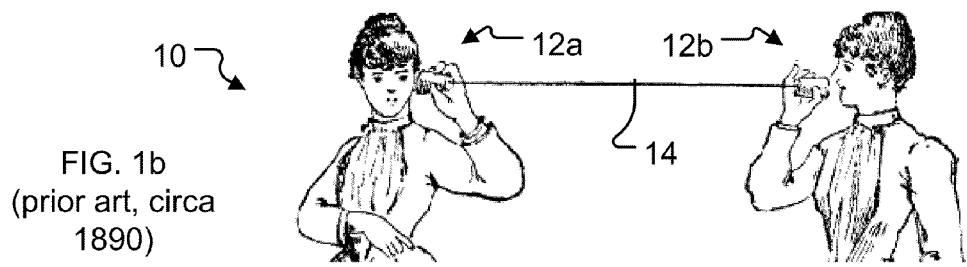
Figure 2:
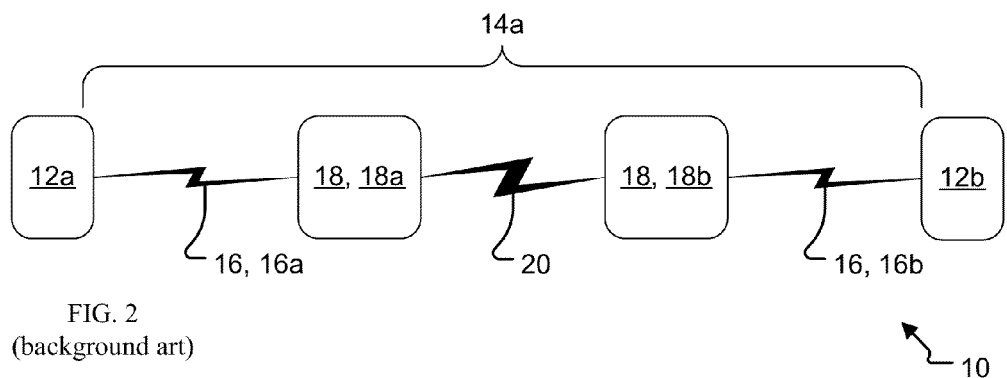
FIG. 2 (background art) depicts a slightly more sophisticated but still rather basic telecommunications network.
Figure 3:
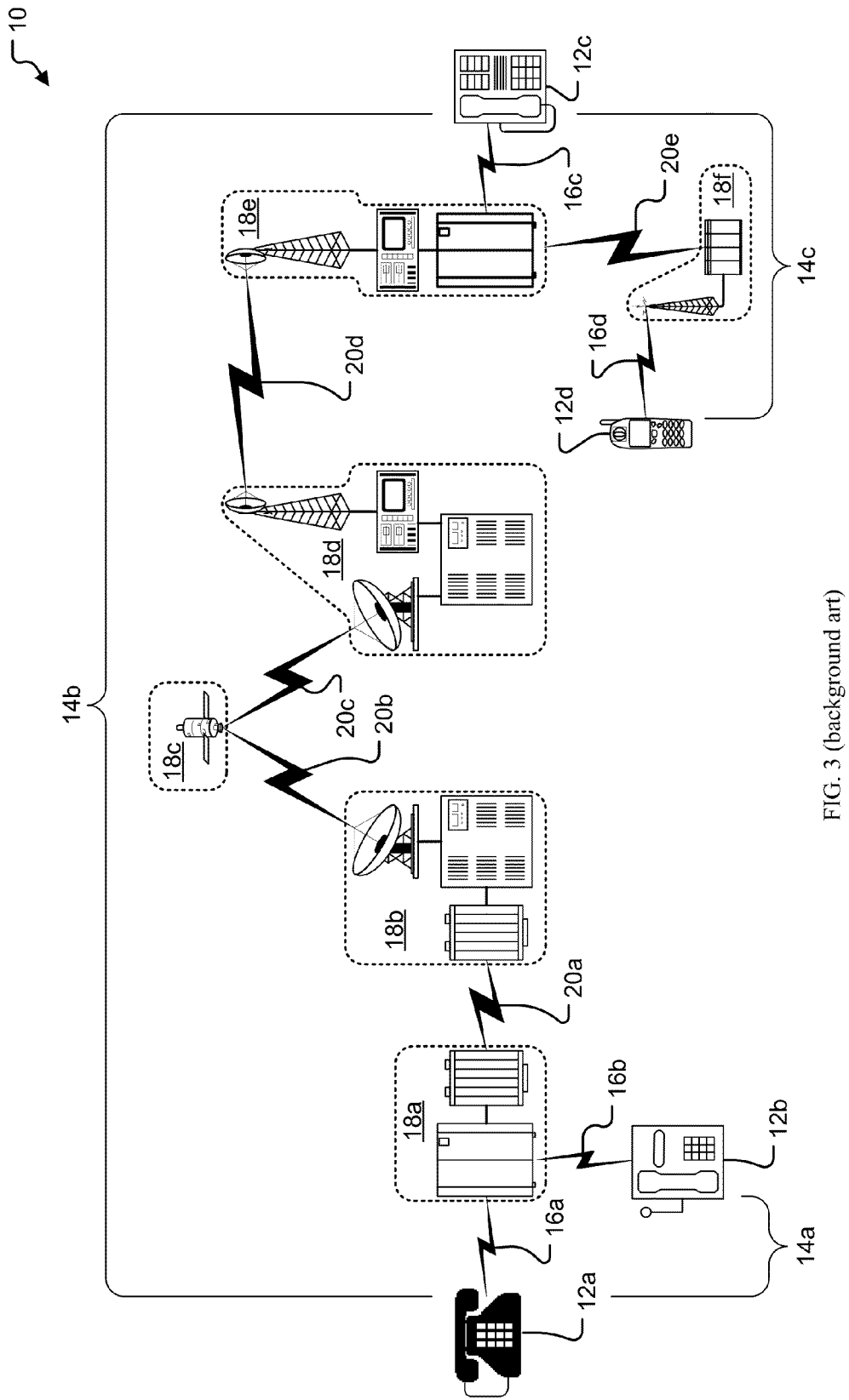
FIG. 3 (background art) depicts three representative communications examples in a modern telecommunications network.
Figure 4:
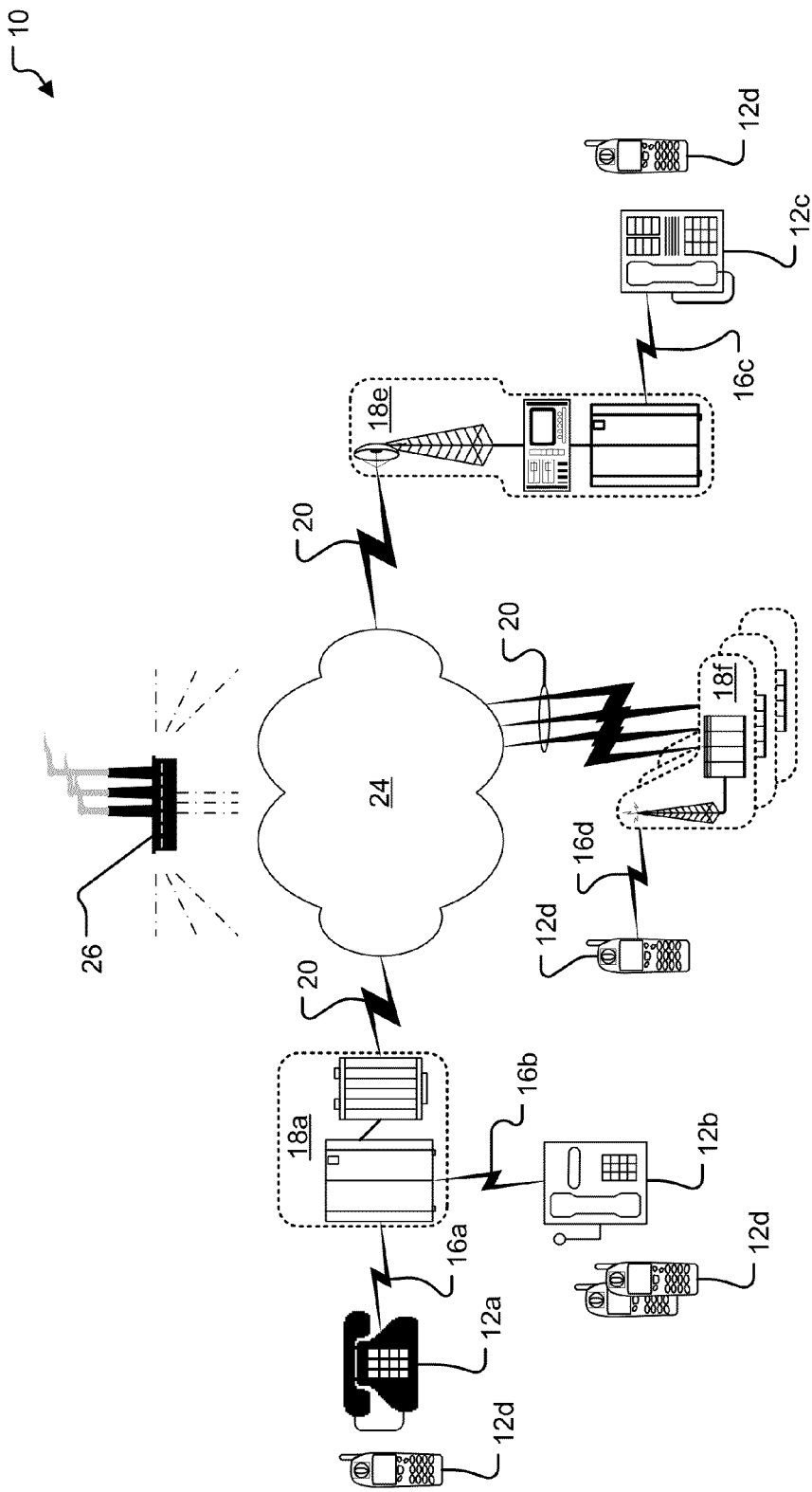
FIG. 4 (background art) is a simplified version of FIG. 3, with some pertinent information added and some minor changes made to facilitate discussion, including some generalizations about the history of telephony.
Figure 5:
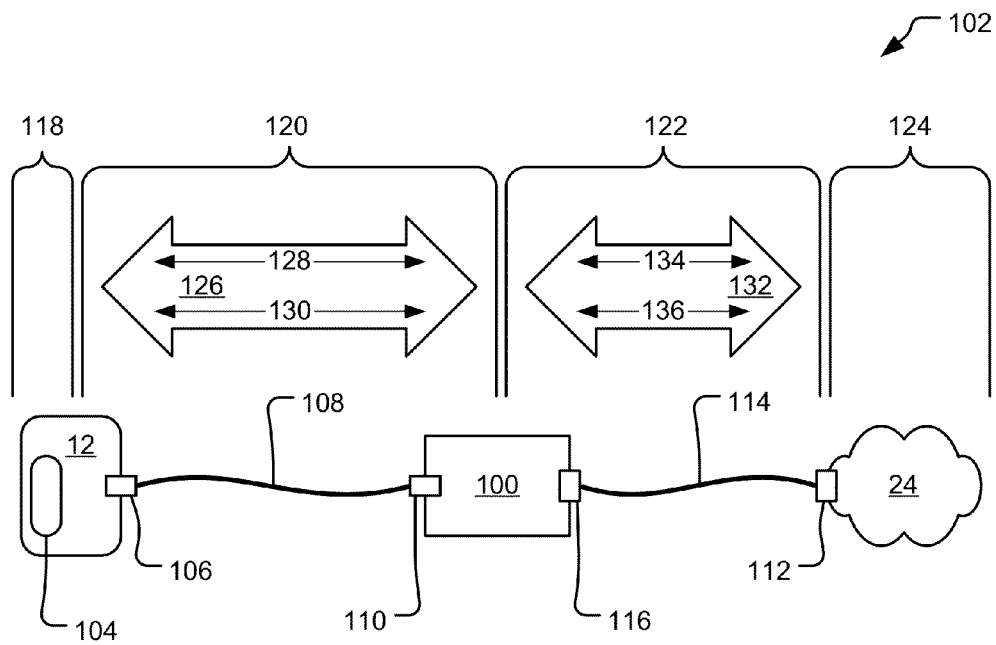
FIG. 5 is a schematic block diagram that shows an overview of an example telephone interface and an environment in which it may be used, wherein this telephone interface particularly works with the digital circuitry present today in many telephones.
Figure 7:
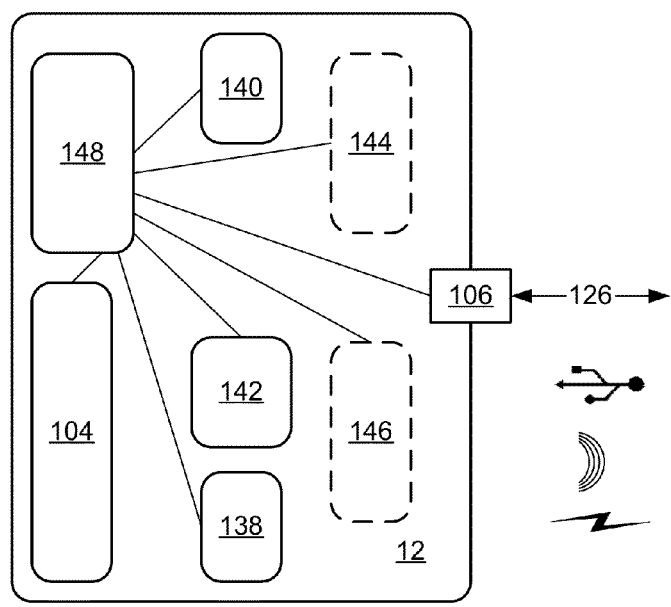

FIG. 7 is a schematic block diagram showing major features as well as some optional features of a telephone that is suitable for use with the telephone interface in FIG. 5.

Figure 8:
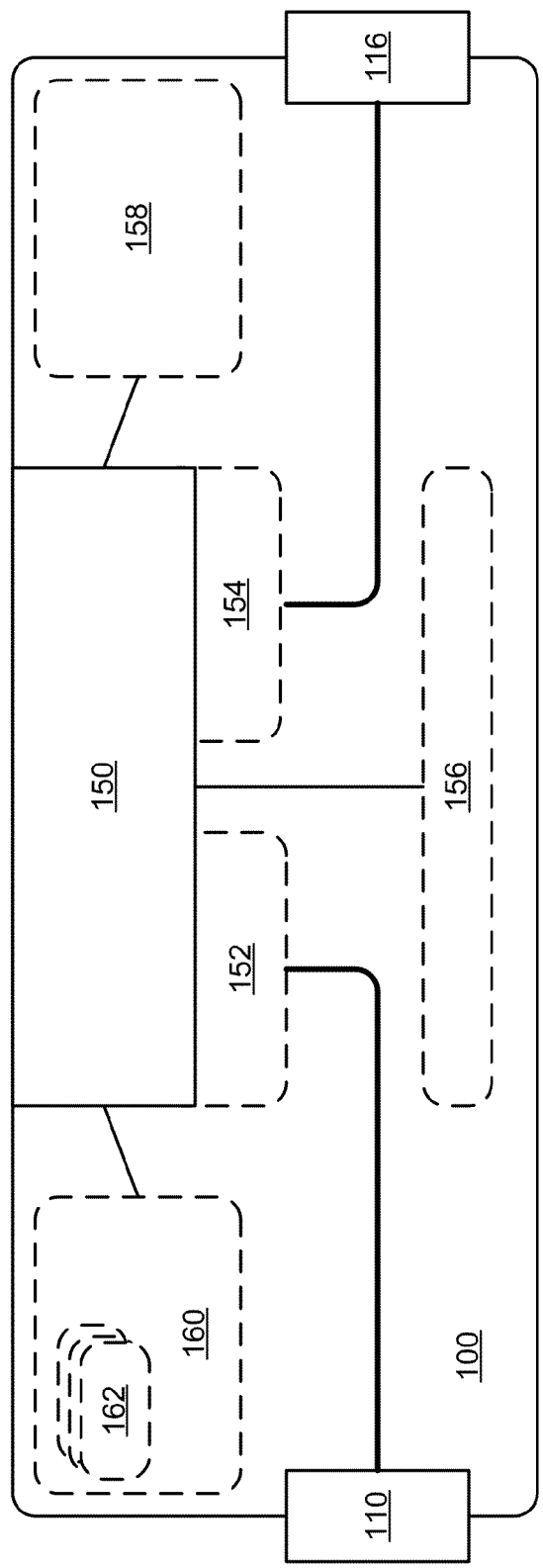

FIG. 8 is a schematic block diagram showing major features as well as some optional features of the telephone interface in FIG. 5.

Figure 9:
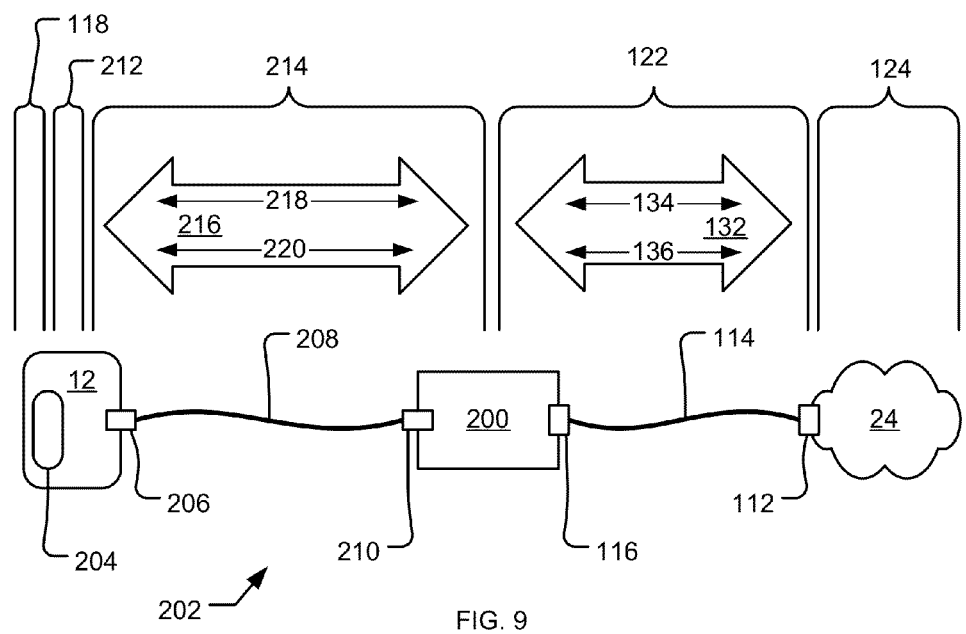

FIG. 9 is a schematic block diagram that shows an overview of an example telephone interface and an environment in which it may be used, wherein this telephone interface particularly works with the analog circuitry present today in many telephones.

Figure 10:
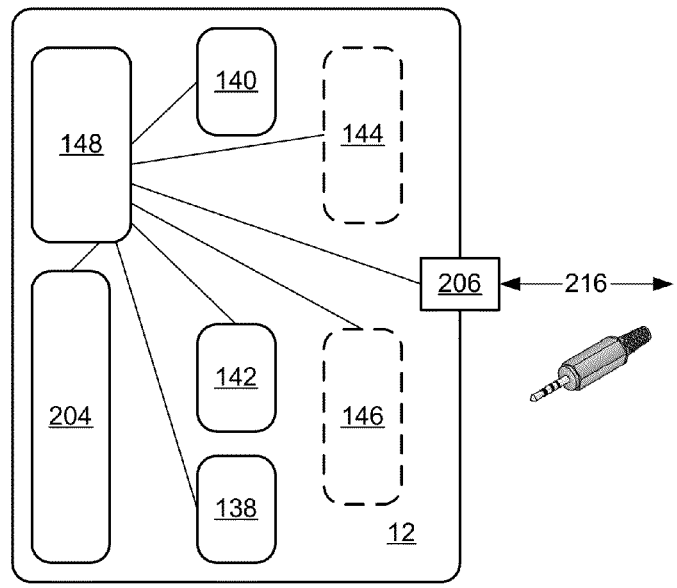

FIG. 10 is a schematic block diagram showing major features as well as some optional features of a telephone that is suitable for use with this telephone interface in FIG. 9.

Figure 11:
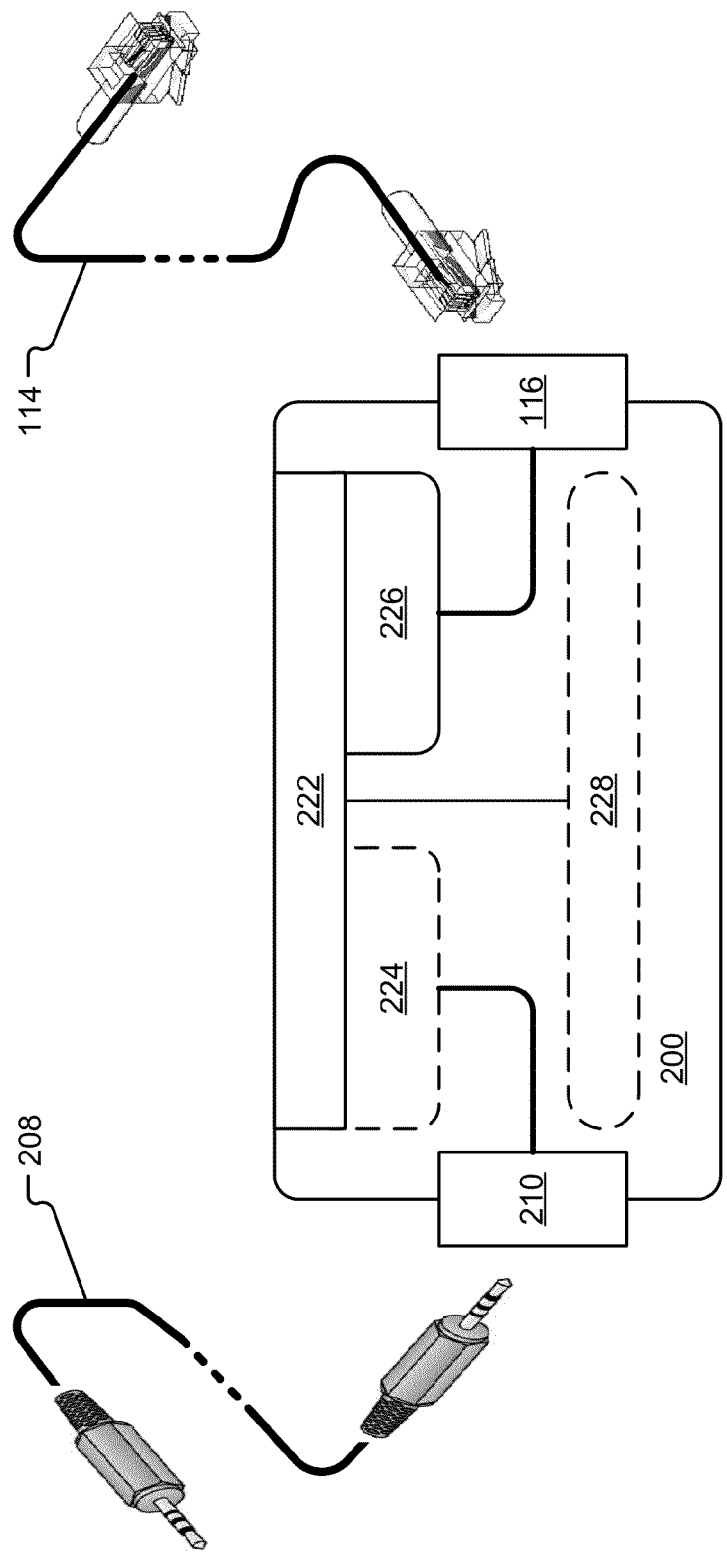

FIG. 11 is a schematic block diagram showing major features as well as some optional features of the telephone interface in FIG. 9.

Figure 12:
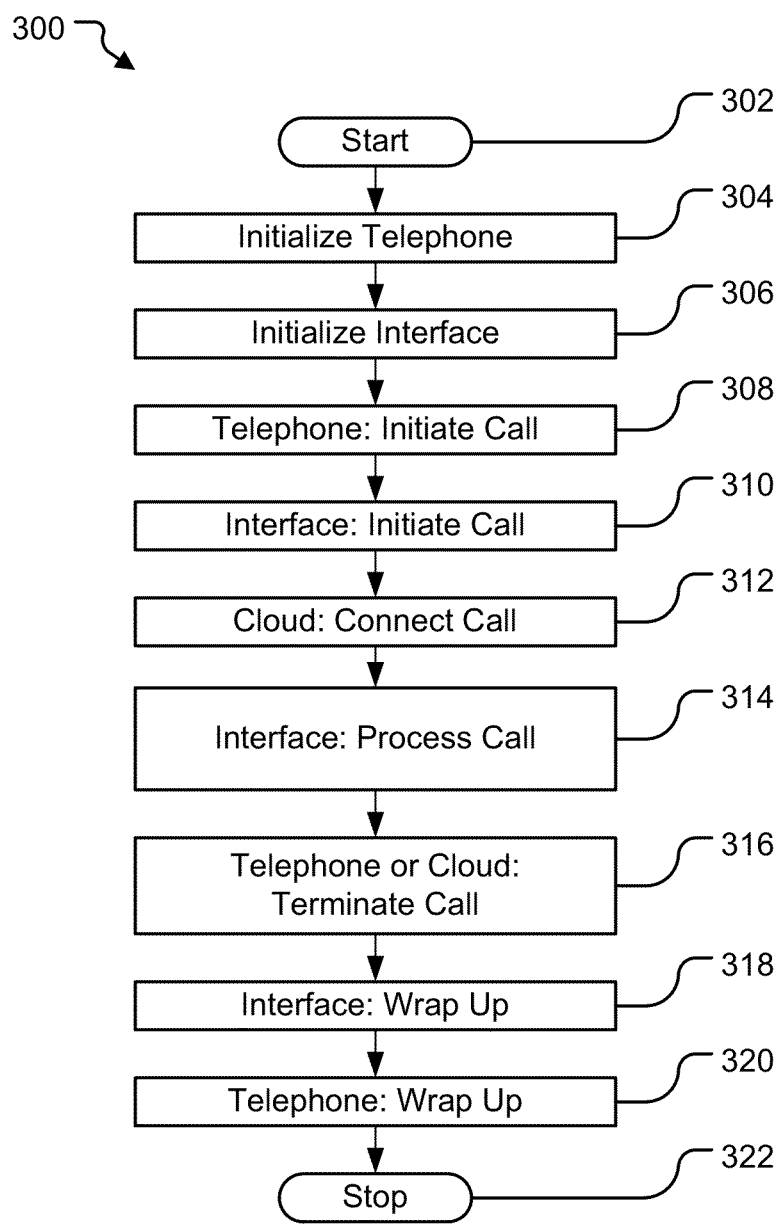

FIG. 12 is a flow chart of a call-placing interface process for a subscriber to place a call using the telephone and the telephone interface.

Figure 13:
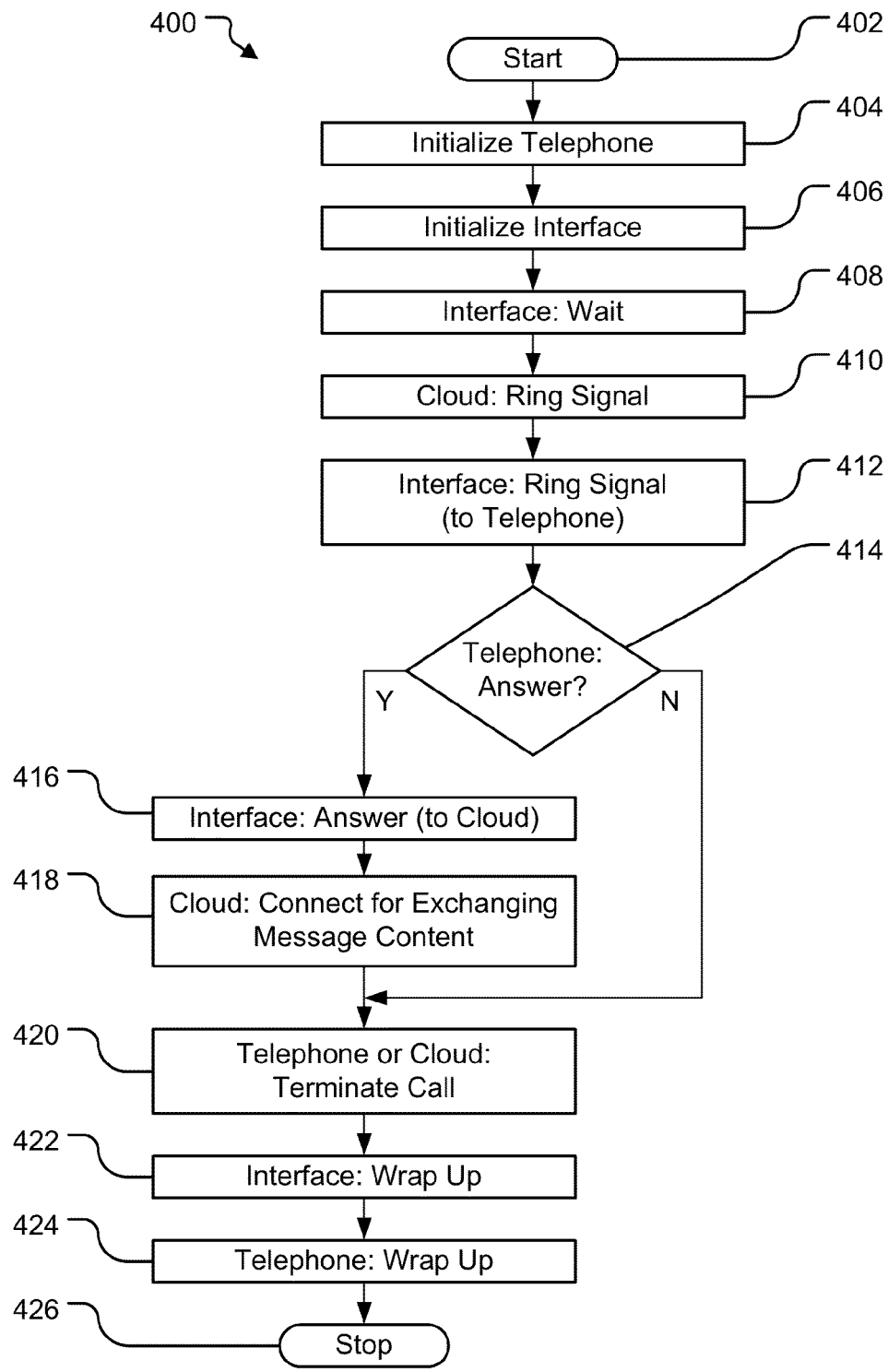

FIG. 13 is a flow chart of a call-receiving interface process for a subscriber to receive a call using the telephone and the telephone interface.

In the various figures of the drawings, like references are used to denote like or similar elements or steps.

DETAILED DESCRIPTION OF THE INVENTION

A preferred embodiment of the present invention is a Telephone Interface. As illustrated in the various drawings herein, and particularly in the views of FIGS. 5, and 8-10, embodiments of the invention are depicted by the general reference characters 100 and 200.

Briefly and somewhat generalizing, it has been the present inventor's observation that we today have many excellent analog and digital telephone technologies; and that we have mechanisms to interface subscriber-side analog telephone technology with service provider-side digital telephone technology; but that we do not have a mechanism to interface subscriber-side digital telephone technology with service provider-side analog telephone technology.

As just one example, even though many modern cell phones have powerful digital and analog circuitry one cannot plug these into a standard RJ-11 telephone wall jack to make a call. As examples already discussed herein have implied, however, there are situations, such as human and natural disasters, where it is desirable to be able to employ the more robust and reliable features of POTS and PSTN with modern devices.

FIG. 5 is a schematic block diagram that shows an overview of an example telephone interface 100 and an environment 102 in which it may be used. This telephone interface 100 particularly works with the digital circuitry present today in many telephones 12. Largely conventional elements here are the telephone 12 and the cloud 24, both of which are what the telephone interface 100 interfaces between.

Some important features of the telephone 12 are that it has an added programmed application 104, and a first subscriber-side port 106 that connects via a subscriber-side channel 108 to a second subscriber-side port 110 in the telephone interface 100.

The cloud 24 here is essentially the same as that discussed in the background section, except that it here is extended to a first provider-side port 112 that connects via a provider-side channel 114 to a second provider-side port 116 in the telephone interface 100.

The overall environment 102 here can be viewed, left to right, as having a user-side analog sector 118, a subscriber-side digital sector 120, a provider-side analog sector 122, and a provider-side digital sector 124, as shown. The user-side analog sector 118 is present in the telephone 12, if for no other reason, because the microphones and speakers which users speak into and listen to are analog devices. The subscriber-side digital sector 120 includes the main digital circuitry of the telephone 12, the subscriber-side ports 106, 110, the subscriber-side channel 108, and portions of the telephone interface 100. The provider-side analog sector 122 includes portions of the telephone interface 100, the provider-side ports 112, 116, and the provider-side channel 114. And the provider-side digital sector 124 includes the cloud 24.

Of particular present interest here are the subscriber-side digital sector 120 and the provider-side analog sector 122, and the signals in these. The figures depict these various signals with references to facilitate discussion. As stylistically shown, subscriber-side digital signals 126 are inter communicated between the telephone 12 and the telephone interface 100 in the subscriber-side digital sector 120. These subscriber-side digital signals 126 are characterized by containing subscriber-side digital control content 128 and subscriber-side digital voice content 130. Some typical examples of the subscriber-side digital control content 128 are digital codes representing the contents of TBLS. 1-2 (FIGS. 6a-b). The subscriber-side digital voice content 130 is as implied, that is, digitized speech. The specific nature of the subscriber-side digital signals 126 is set by whatever protocol is used across the subscriber-side digital sector 120 by both the telephone 12 and the telephone interface 100, e.g., USB, Bluetooth, WiFi, ZigBee, Near Field Communications (NFC), etc.

As also stylistically shown, provider-side analog signals 132 are inter communicated between the telephone interface 100 and the cloud 24 in the provider-side analog sector 122. These provider-side analog signals 132 are characterized by containing provider-side analog control content 134 and provider-side analog voice content 136. Some typical examples of the provider-side analog control content 134 are the analog tonal signals shown in TBLS. 1-2 (FIGS. 6a-b). The provider-side analog voice content 136 is also as implied, that is, analog speech. The specific nature of the provider-side analog signals 132 is set by whatever protocol is used across the provider-side analog sector 122 by both the cloud 24 and the telephone interface 100.

FIG. 7 is a schematic block diagram showing major features as well as some optional features of a telephone 12 that is suitable for use with this telephone interface 100. In addition to the already noted programmed application 104 and the subscriber-side port 106, the telephone 12 has a sound input transducer 138, e.g., a microphone, and a sound output transducer 140, e.g., a speaker. Optionally, the telephone 12 may have a user input transducer 142, e.g., a keypad or touch screen. It is anticipated that most telephones 12 used with the telephone interface 100 will have this option, but it should be noted that it is not necessary.

Also optionally, the telephone 12 may have a power source 144 and a memory 146. For instance, if the telephone 12 is a cell phone 12d its battery will be the power source 144.

Similarly, if the telephone 12 is a smart type of cell phone 12d, for example, it typically will have a memory 146, say, to hold user entered data such as telephone numbers, e-mail addresses, etc.

Continuing with FIG. 7, the telephone 12 has a controller 148 that is suitable to execute the programmed application 104 and to operate all of the other features that are present.

A telephone 12 for use with the telephone interface 100 typically will be distinguished from telephones in general by not having the capability for direct connection to a POTS or PSTN type service. For instance, the telephone 12 used here can particularly be a cell phone 12d. Alternately, the telephone 12 may be a member of a larger set of devices that are not usually regarded as telephones. For example, some computerized tablets, laptop computers, and personal computers are suitable for use as the telephone 12.

FIG. 8 is a schematic block diagram showing major features as well as some optional features of the telephone interface 100. In addition to the already noted second subscriber-side port 110 and the second provider-side port 116, the telephone interface 100 has control circuitry 150. Optionally, the telephone interface 100 may have subscriber-side conversion circuitry 152, provider-side conversion circuitry 154, a power source 156, a user control 158, and a memory 160. If the memory 160 is present, it then may be a static type of memory that stores one or more optional interface applications 162.

As implied above, the only strictly necessary features of the telephone interface 100 are the subscriber-side port 110, the control circuitry 150, and the provider-side port 116 (and some manner of housing these). When connected to the telephone 12, the subscriber-side port 110 may be able to receive sufficient power to partially or fully operate the control circuitry 150. Alternately or additionally, when connected to the cloud 24, the provider-side port 116 may be able to receive sufficient power to partially or fully operate the control circuitry 150. Granted, such parasitically powered embodiments of the telephone interface 100 will impose requirements on the control circuitry 150 that may be difficult or impractical to overcome (e.g., higher cost, susceptibility to EMI, etc.), but even such minimalist embodiments are within the spirit of the present invention.

It is anticipated that many embodiments of the telephone interface 100 will have the subscriber-side conversion circuitry 152 and also the provider-side conversion circuitry 154, because many current candidates for the control circuitry 150 will not directly work with the signal levels from the subscriber-side port 110 and the provider-side port 116 (i.e., have matching voltage and current levels). For example, if the subscriber-side port 110 is a USB type port, 5 volt signal levels must be handled. If the provider-side port 116 is a typical U.S. standard POTS/PSTN type port, signal levels approaching 100 volts must be handled. In contrast, many microcontrollers today that are desirable for use in the control circuitry 150 operate at 1.8 or 3.3 volt levels.

Different approaches to constructing the subscriber-side conversion circuitry 152 and the provider-side conversion circuitry 154 are possible. Discrete components can be used, but it is anticipated that the more typical case will be to use already widely available integrated circuits and modules (e.g., from vendors such as Maxim Integrated Products, Texas Instruments, Panasonic, etc.). Many components suitable for interfacing USB, Bluetooth, WiFi, ZigBee, NFC, etc. protocols to microprocessors are available, and thus are candidates for use in the subscriber-side conversion circuitry 152. Similarly, many components suitable for interfacing modern electronic devices to POTS/PSTN are also available and are candidates for use in the provider-side conversion circuitry 154.

[The inventor has consulted with a technician on designing an embodiment using a Texas Instruments MSP430™ series micro processor. These processors have many desirable features, including a well developed knowledge base that includes telecommunications applications, as well as a relatively straightforward design path to more powerful devices if necessary. Many variations within the MSP430 series are available, including different clock speeds, memory types and capacities, power requirements, and analog to digital (ADC) and digital to analog (DAC) options. These processors also interface well with other useful modules and discreet-component circuits. For instance, Texas Instruments' TUSB3410 integrated circuit is widely used to provide USB communications with MSP430 processors, and Roving Networks' RN-42 and RN-171 modules can similarly provide Bluetooth and WiFi. When these devices are used, the need for further subscriber-side conversion circuitry 152 is essentially eliminated. For provider-side conversion circuitry 154 (and considerably more, if desired) a device like Atmel's U4091 Programmable Telephone Audio Processor can be used, although the capabilities of this device will be grossly underutilized in most currently envisioned embodiments of the telephone interface 100.]

Continuing, many candidates for the power source 156 also already exist. Obviously, a traditional battery is one such candidate. A conventional replaceable battery can be used, or a rechargeable battery can be used. If a rechargeable battery is used it may be removable for recharging in an external charger, or it may be integrated into the telephone interface 100 and recharged in place. One useful feature here is to permit recharging from a conventional automotive power terminal (~12 volts DC), say, with the very same recharging cable used to recharge the user's cell phone 12d. But use of such an easily exhausted power source 156 may still be non-optimal in some embodiments of the telephone interface 100. Other candidates are harvesting power from light, e.g., with a solar cell; harvesting power from a heat source, e.g., with a bi-metallic junction; harvesting power from human movement, e.g., with a micro-generator or piezoelectric element; or generating power from a one-time chemical reaction (distinguishable from traditional batteries that discharge even when not in use).

The user control 158 is straightforward and many suitable candidates for it also already exist, such as buttons and even speech control. This feature is one that the inventor feels is unlikely to appear in many embodiments of the telephone interface 100. First, a user control 158 would be redundant with most candidates for the telephone 12. Most suitable telephones 12 will already have user controls, some quite sophisticated, and those controls can be used to configure and control the telephone interface 100, via the subscriber-side ports 106, 110 and the subscriber-side channel 108. Secondly, a user control 158 would require making the telephone interface 100 physically larger and less robust than may be desired. And third, the telephone interface 100 can be designed so that user control is simply not required.

In contrast, the memory 160 is a feature that the inventor feels is likely to be provided in many embodiments of the telephone interface 100. The memory 160 in combination with the control circuitry 150 permit many optional features to be "programmed into" the telephone interface 100. Some particularly powerful examples are the interface applications 162.

Briefly, since usage is discussed in detail presently, the inventor anticipates that the telephone interface 100 will particularly be used in emergency situations. In an emergency, there are usually two key issues: what number is one going to call and how is that going to be done (e.g., standard, pre-paid, collect, enter-code-to-continue, etc.). An interface application 162 can handle both of these issues, by calling a pre-stored telephone number (and extension if appropriate) and by providing any codes, selecting appropriate options, etc. to complete a connection.

Embodiments of the telephone interface 100 with a single interface application 162 can operate entirely automatically, being manufactured or field programmed with the interface application 162 containing all necessary call information. That information can be a single number and how it is used, or it can be multiple detail sets, say, to be tried sequentially until a call is completed; or to be called depending on the time (e.g., day, night, holiday); on the user's present geographic location (e.g., based on the programmed application 104 in a location detecting smart cell phone 12*d* having indicated whether the user is in California or Oregon); or based on the local protocol used by the cloud 24 (e.g., automatically changing signal levels, frequencies, and conventions based on whether the telephone interface 100 is in North America or Europe); etc. Clearly, even a single interface application 162 can make the telephone interface 100 a very sophisticated tool.

Alternately, with even a minimal user control 158 or under control remotely from the telephone 12, a single interface application 162 can be turned off or multiple interface applications 162 can be selected from.

FIG. 9 is a schematic block diagram that shows an overview of an example telephone interface 200 and an environment 202 in which it may be used. This telephone interface 200 particularly works with the analog circuitry present today in many telephones 12. Again, largely conventional elements here are the telephone 12 and the cloud 24, both of which are what the telephone interface 200 interfaces between. Important features of the telephone 12 are that it has an added programmed application 204, and a first subscriber-side port 206 that connects via a subscriber-side channel 208 to a second subscriber-side port 210 in the telephone interface 200. The cloud 24 here may be entirely the same, and thus the provider-side ports 112, 116 and the provider-side channel 114 may be the same as for the already discussed telephone interface 100.

The overall environment 202 here can be viewed, left to right, as having the user-side analog sector 118, a subscriber-side digital sector 212, a subscriber-side analog sector 214, the provider-side analog sector 122, and the provider-side digital sector 124, as shown. As the use of the references here imply, the sectors 118, 122, and 124 can potentially be exactly the same as those used with the telephone interface 100).

The subscriber-side digital sector 212 is usually present in the telephone 12. In theory, it may not be present, but as a practical matter it is in essentially all modern telephones 12 and it then includes the main circuitry of the telephone 12. [Digressing, a same or equivalent subscriber-side digital sector is typically present in telephones 12 used with the telephone interface 100, but none is shown in FIG. 5 to avoid potential confusion there.]

Of particular present interest here are the subscriber-side analog sector 214 and the provider-side analog sector 122 (again), as well as the signals in these. The figures depict these various signals with references to facilitate discussion.

The subscriber-side analog sector 214 includes the subscriber-side ports 206, 210, the subscriber-side channel 208, and all of the telephone interface 200 (although the telephone interface 200 can and in most embodiments likely will include internal digital circuitry). As stylistically shown, subscriber-side analog signals 216 are inter communicated between the telephone 12 and the telephone interface 200. These subscriber-side analog signals 216 are characterized by containing subscriber-side analog control content 218 and subscriber-side analog voice content 220. Some typical examples of the subscriber-side analog control content 218 are analog signals representing the contents of TBLS. 1-2 (FIGS. 6*a-b*). The subscriber-side analog voice content 220 is as implied, that is, analog speech. The specific nature of the subscriber-side analog signals 216 is set by whatever protocol is used across the subscriber-side analog sector 214 by both the telephone 12 and the telephone interface 200.

As has already been described (for the telephone interface 100), the provider-side analog signals 132 are inter communicated between the telephone interface 200 and the cloud 24 in the provider-side analog sector 122, and the provider-side analog signals 132 are characterized by containing provider-side analog control content 134 and provider-side analog voice content 136. Some typical examples of the provider-side analog control content 134 are the analog tonal signals shown in TBLS. 1-2 (FIGS. 6*a-b*). The provider-side analog voice content 136 is also as implied, that is, analog speech. The specific nature of the provider-side analog signals 132 is set by whatever protocol is used across the provider-side analog sector 122 by both the cloud 24 and the telephone interface 100.

Unlike the telephone interface 100, which fills a subscriber-side digital to provider-side analog interface role, the telephone interface 200 here fills a subscriber-side analog to provider-side analog interface role. It might therefore initially seem that the subscriber-side analog signals 216 and the provider-side analog signals 132 can simply be the same, and that the telephone interface 200 is simply redundant. As will become clear, presently, the subscriber-side analog control content 218 and the provider-side analog control content 134 are necessarily quite different in their respective natures. In contrast, the subscriber-side analog voice content 220 and provider-side analog voice content 136 may be the same but there usually reasons, also discussed presently, why they are also different.

FIG. 10 is a schematic block diagram showing major features as well as some optional features of a telephone 12 that is suitable for use with this telephone interface 200. As the use of the references here imply, many elements of telephones 12 for use with both telephone interfaces 100, 200 may be exactly the same. The only necessary differences are in the respective programmed applications 104, 204 and subscriber-side ports 106, 206, because these must work with the subscriber-side digital signals 126 versus the subscriber-side analog signals 216.

Thus, for instance, if the telephone 12 is a iPhone™ or a Motorola Razor™ type smart phone it may be used with either of the telephone interfaces 100, 200. These example telephones 12 have USB, Bluetooth, WiFi, and/or NFC ports that are suitable for use as the (digital) subscriber-side port 106. These example telephones 12 also have microphone and speaker jacks (ports) that are suitable for use as the (analog) subscriber-side port 206. The controllers 148 present in these telephones 12 thus inherently are capable of working with these subscriber-side ports 106, 206, under suitable direction by either of the programmed applications 104, 204, to work with either the subscriber-side digital signals 126 or the subscriber-side analog signals 216.

FIG. 11 is a schematic block diagram showing major features as well as some optional features of the telephone interface 200. In addition to the already noted second subscriber-side port 210 and the second provider-side port 116, the telephone interface 200 has control circuitry 222, optional subscriber-side conversion circuitry 224, provider-side conversion circuitry 226, and an optional power source 228. The subscriber-side channel 208 and the provider-side channel 114 are stylistically depicted in FIG. 11 to show their typical nature, with RJ-11 jacks and phono-jacks at both ends, but this arrangement is not a requirement for all embodiments of the inventive telephone interface 200. For instance, to avoid cables getting mislaid or lost, these channels 114, 208 can be integrated with the ports 116, 210 of the telephone interface 200.

The subscriber-side conversion circuitry 224 is optional, but usually present in some manner. Depending on the sophistication of the controller 148 and the subscriber-side port 206, it may be possible for the telephone 12 to provide the subscriber-side analog signals 216 to the telephone interface 200 of a nature that the control circuitry 222 can directly handle. More typical however, the inventor expects that the subscriber-side conversion circuitry 224 will include at least signal level conversion circuitry. Additionally or alternately, the inventor expects that the subscriber-side conversion circuitry 224 will include protection circuitry (e.g., a simple zener diode to prevent possible over-voltage signals damaging the control circuitry 222).

In contrast, the provider-side conversion circuitry 226 is not expected to be optional (theoretically it might be, however, so this should not be regarded as a limitation). It should be recalled here that common signals on the provider-side channel 114 approach 50 volts DC and 100 volts AC. Signal level conversion circuitry is therefore needed to work with most candidate circuitry for the control circuitry 222. (e.g., micro processors and other integrated circuits that work with 5, 3.3, or 1.8 volts DC nominal voltages). And even moreover here, especially due to the voltages present and their wide ranges, and the typical length of and possible inductive effects in the provider-side channel 114, protection circuitry is expected to be necessary to prevent damage to the control circuitry 222 (e.g., at least a zener diode, perhaps a signal transformer, and/or a metal-oxide varistor (MOV) or an equivalent).

If a power source 228 is provided, its nature can be similar to that of the power source 156, already discussed with the telephone interface 100.

FIG. 11 does not show elements equivalent to the user control 158, memory 160, and interface application 162 of the telephone interface 100. This is not because such features may not be present in the telephone interface 200. In fact, the inventor expects that they will be in many embodiments. These elements have been omitted here, however, to emphasize that the programmed application 204 and the telephone 12 can provide most or all of the equivalent functionality.

FIG. 12 is a flow chart of a call-placing interface process 300 for a subscriber to place a call using the telephone 12 and the telephone interface 100, 200. In a step 302 the interface process 300 starts. At this point the user-subscriber has the telephone 12, the telephone interface 100, 200, and access to the cloud 24 via the provider-side channel 114.

In a step 304 the telephone 12 is initialized and in a step 306 the telephone interface 100, 200 is initialized. The order of step 304 and step 306 may vary or overlap.

To initialize the telephone 12, it is powered on and brought to the state in which it has its standard functionality. That is, to the state at which it could be used to make a conventional telephone call or execute a conventional software application.

To initialize the telephone interface 100, 200, it is powered on (if necessary). Note if the telephone 12 is in a sleep state, activity at its subscriber-side port 106, 206 may be one option to wake and trigger initialization. For instance, if the telephone 12 is a smart cell phone, connection of a cable at its USB port may trigger step 304.

To initialize the telephone interface 100, 200, it is powered on and brought to the state it can communicate with the telephone 12 and the cloud 24. In general, since the control circuitry 150, 222 presumably will require at least some power to operate, the presence of power to the control circuitry 150, 222 can trigger initialization. If the power source 156, 228 is non deplete-able (e.g., a solar cell rather than a battery) the telephone interface 100, 200 can exist in essentially a permanently initialized state. Alternately, the control circuitry 150, 222 may have a very low power draw sleep mode where it monitors for and awakes upon any activity at any of the subscriber-side port 106, 206, the provider-side port 116, or the user control 158. Still alternately, the user control 158 can be used to turn on the telephone interface 100, 200, upon which initialization automatically then occurs.

One sophisticated option here is to have the telephone 12 and the telephone interface 100, 200 communicate to automatically start or wake the programmed application 104, 204 in the telephone 12. For example, in essentially conventional manner for USB equipped devices, the telephone 12 can detect that something has been attached to its USB port (i.e., subscriber-side port 106), query what that is and the telephone interface 100 can reply accordingly, and the telephone 12 then can start the programmed application 104. At present, the inventor is not aware of any telephones that monitor instances of the subscriber-side port 206 (e.g., a speaker-microphone jack) for external device connection but, if or when such telephones do exist, they and the telephone interface 200 may work in similar manners.

In a step 308 the telephone 12 initiates a call. The programmed application 104, 204 here communicates with the telephone interface 100, 200 to request that it communicate an "off-hook" signal to the cloud 24. If the telephone interface 100, 200 does not detect a signal (e.g., DC voltage) from the cloud 24 at the provider-side port 116, something is wrong and needs to be dealt with. Typically however, a signal from the cloud 24 is present, and the telephone interface 100, 200 sends the signal (e.g., by closing a circuit to cause a DC current to flow). The cloud 24 detects this (at the local aggregation node 18), and provides a dial tone to the telephone interface 100, 200. The telephone interface 100, 200 then provides a dial tone or other signal representing such to the telephone 12, where the programmed application 104, 204 detects this and proceeds with placing the call by providing the call details as control content 128, 218 to the telephone interface 100, 200.

If the programmed application 104, 204 has pre-set call details (telephone number to call and/or manner in which to place the call), those are communicated to the telephone interface 100, 200. Alternately, such call details can be default values in the programmed application 104, 204 that the user of the telephone 12 can override with the user input transducer 142. Still alternately, the user can enter the desired call details with the user input transducer 142, or select them from an existing database of call details in the telephone 12.

Further here in step 308, the programmed application 104, 204 operates the telephone 12 such that voice communications signals travel via the subscriber-side port 106, 206, rather than via the other channels that may be available to the telephone 12. For instance, if the telephone 12 is a cell phone 12*d* that conventionally handles calls in radio channels and the subscriber-side port 106 is a USB port or the subscriber-side port 206 includes a speaker-microphone jack, the cell phone 12d will now use the subscriber-side port 106, 206 for calls.

In a step 310 the telephone interface 100, 200 initiates the call. More specifically, it has received the call details from the telephone 12 or it already has those details hard-wired or in an interface application 162. What is received from the telephone 12 triggers the use of the now present details. In passing, the telephone 12 can provide additional information to be used by an interface application 162 (e.g., location, time of day, etc.). The control circuitry 150, 222 initiates connection with the cloud 24. This may entail sensing what protocols are used by the cloud 24 (e.g., voltage levels) or negotiating for common protocols (e.g., signal frequencies). Further here in step 310, the telephone interface 100, 200 provides the call details to the cloud 24.

In a step 312 the cloud 24 connects the telephone interface 100, 200, and thus the telephone 12 to a telephone device of a remote party. This can be done in entirely conventional manner in the cloud 24, since the telephone interface 100, 200 handles all interfacing necessary for the cloud 24 to "see" it as just another POTS or PSTN device. If the call cannot be completed by the cloud 24, in straightforward manner, conventional signals are communicated back to the telephone interface 100, 200, and thus to the telephone 12.

In a step 314 the cloud 24, the telephone interface 100, 200, and the telephone 12 (running the programmed application 104, 204) process the body of the call. For instance, the remote party says "hello" and the user of the telephone 12 replies and a conversation ensues.

In a step 316 one party terminates the call, typically in entirely conventional manner by hanging up. If the remote party hangs up, the cloud 24 detects this and signals the telephone interface 100, 200. Conversely, if the user of the telephone 12 hangs up, the telephone interface 100, 200 detects this and signals the cloud 24.

In a step 318 the telephone interface 100, 200 wraps up and in a step 320 the telephone 12 wraps up. The order of step 318 and step 320 may also vary or overlap.

Finally, in a step 322 the interface process 300 stops.

It is anticipated that the interface process 300 will be all that many embodiments of the telephone interface 100, 200 are used for. But more sophisticated embodiments of the telephone interface 100, 200 can handle more complex scenarios.

FIG. 13 is a flow chart of a call-receiving interface process 400 for a subscriber to receive a call using the telephone 12 and the telephone interface 100, 200. In a step 402 the interface process 400 starts. At this point the user-subscriber has the telephone 12, the telephone interface 100, 200, and access to the cloud 24 via the provider-side channel 114.

In a step 404 the telephone 12 is initialized and in a step 406 the telephone interface 100, 200 is initialized. The order of step 404 and step 406 may vary or overlap. To initialize the telephone 12, it is powered on and brought to the state in which it has its standard functionality. That is, to the state at which it could be used to receive a conventional telephone call. Additionally, the telephone 12 starts to execute the programmed application 104, 204, which proceeds to "listen" to the subscriber-side port 106, 206. To initialize the telephone interface 100, 200, it is powered on (if necessary) and it determines if it is receiving a DC signal from the cloud 24 (if not, something is wrong and can be handled as desired).

In a step 408 the telephone interface 100, 200 waits (e.g., continuing to receive the DC signal and providing an open circuit so that essentially no current from it flows).

In a step 410 the cloud 24 sends a ring signal (e.g., if POTS protocol is used, nominally 65 volts AC).

In a step 412 the telephone interface 100, 200 detects this ring signal (e.g., across a capacitor, which passes the AC signal but blocks the DC signal), and the telephone interface 100, 200 provides a ring signal to the telephone 12. Note, this ring signal can be the PSTN type ring signal in TBL. 2 or some other preset signal, since it can be any that is acceptable to both the programmed application 104, 204 and the telephone interface 100, 200. The telephone interface 100, 200 typically provides this ring signal continuously until the programmed application 104, 204 replies (i.e., picks up) or until the remote caller hangs up and the telephone interface 100, 200 detects this via the cloud 24. Alternately, a preset protocol of signals can be used so that a continuous ringing signal is not necessary and power for such is saved.

In a step 414 the telephone 12 receives the ring signal and the interface process 400 branches. If the telephone 12 answers the call, typically by its user using the telephone 12 in conventional manner to "pick up" and accept a call, the telephone 12 (via the programmed application 104, 204) stands ready for exchange of the message content (control and/or voice content), and provides a picked up signal to the telephone interface 100, 200, and a step 416 follows.

In step 416 the telephone interface 100, 200 receives the picked up signal from the telephone 12 and proceeds by signaling the cloud 24 to put the call through (e.g., by closing a circuit so that DC current flows). Additionally, the telephone interface 100 also stands ready for exchange of the message content.

In a step 418 the cloud 24 detects an "off hook" signal, ceases providing the ring signal, and completes the connection so that the respective parties can exchange in a dialog of the message content.

Presumably eventually, in a step 420 either the cloud 24 or the telephone 12 terminates the call. If the cloud 24 terminates, it signals the telephone interface 100, 200 in conventional manner. Alternately, if the telephone 12 terminates, the telephone interface 100, 200 detects this (or is affirmatively signaled by the programmed application 104, 204), and the telephone interface 100, 200 signals the cloud 24 in essentially conventional manner.

In a step 422 the telephone interface 100, 200 wraps up processing the now completed call (e.g., by going into a low power monitoring mode) and in a step 424 the telephone 12 wraps up the now completed call (e.g., preparing to receive or place a next call). The order of step 422 and step 424 may vary or overlap. And in a step 426 the interface process 400 stops.

Returning briefly to step 414, if the telephone 12 does not answer the call, the telephone interface 100, 200 continues in step 420, presumably until the remote caller hangs up (or an optional timer in the telephone interface 100, 200 terminates as a power saving measure). And then steps 420-426 can follow.

Turning now to a usage example, let us say that a user of the telephone 12 is a paramedic who's skills are likely to be needed in a natural disaster, and let us say that the other party is a dispatcher in a regional disaster management center. At 5:05 pm on a Friday afternoon, in the middle of the commuter rush hours, an earthquake occurs on the New Madrid Fault located South of St. Louis, Mo.

Major utility company power goes off immediately, due to equipment failures as well as precautionary automatic shutdowns of power generation facilities. Note, this will particularly include the many nuclear power plants within a thousand mile radius of St. Louis.

Our hypothetical paramedic has had a day off and is visiting her parents in the northwestern suburb of Maryland Heights, which is some miles away from central St. Louis and the major hospitals where her services can best be used. After the earthquake, the mobile phone networks are more than just spotty, they are overwhelmed and have outright crashed. But our paramedic here has a cell phone 12*d* and a telephone interface 100, 200, and her parents have a typical cordless telephone 12*b*. Of course, the cordless telephone 12*b* will not operate because, even though the handset batteries are fully charged, the base station is powered from a standard 120 VAC wall socket and that power is off. However, our paramedic simply connects her cell phone 12*d* to her telephone interface 100, 200, unplugs the telephone cable (part of the subscriber-side channel 16*b*) to her parent's cordless telephone 12*b*, and then plugs it into her telephone interface 100, 200. POTS/PSTN are up. In fact, due to so many telephones now relying on mains power in some manner, POTS/PSTN are carrying only 10% of what would be a normal usage load.

Our paramedic forthwith calls the regional disaster management center and is connected to the dispatcher. She explains where she is at and notes that traffic, downed bridges, etc. are preventing her from being able to help, and she suggests that the dispatcher advise her of a location within walking distance where she can help or where a helicopter passing through the area might provide her with a ride to a major trauma center. And the dispatcher says "how can I get back to you on that?"

Simple, she provides her parents telephone number and hangs up. Even simpler, the regional disaster management center likely will have caller ID (conventional or enhanced like 911 services use to receive information even for ID-blocked telephone numbers) and the dispatcher can confirm that the paramedic's parent's number (that being used and therefore the number in the caller ID information the dispatcher can see) is to be used. Additionally, the interface application 162 of the paramedic's telephone interface 100, 200 or the programmed application 104, 204 of her cell phone 12*d* can provide her cell phone number, say, automatically to special circuitry at the regional disaster management center. In this manner the center can use that number to index various information. For instance, if cell numbers of emergency personnel are in an available database, merely having this number to provide implies that the paramedic is who she says she is. Further, having this number permits use of it, additionally or alternately, as soon as cellular service resumes.

Continuing with our hypothetical disaster scenario, in due course our paramedic's cell phone 12*d* goes into power saving sleep mode, a state in which it can wait for calls for days before it becomes necessary to recharge the battery (i.e., the power source 144). Waiting long here is not necessary, however, because in 15 minutes the dispatcher does call back, and the telephone interface 100, 200 puts the call through to the paramedic's cell phone 12*d*, and she is instructed to go to a grade school softball field four blocks away and expect transport in 20 minutes.

While various embodiments have been described above, it should be understood that they have been presented by way of example only, and that the breadth and scope of the invention should not be limited by any of the above described exemplary embodiments, but should instead be defined only in accordance with the following claims and their equivalents.

INDUSTRIAL APPLICABILITY

The present telephone interface 100, 200 is well suited for application in modern telecommunications networks 10. For example, as a separate device used with a cell phone 12*d* or other suitable telephone 12, many new capacities are added. Another option here is to integrate the telephone interface 100, 200 literally into suitable future telephones 12 or into facilities in existing or newly being constructed buildings (an example of the latter is discussed presently).

Without limitation, a suitable telephone 12 with the telephone interface 100, 200 can permit communications where cellular service does not reach (e.g., remote rural areas); where cellular service is overloaded (e.g., as in the 2003, 2008, and 2011 infrastructure failure examples noted herein); where cellular service is not secure (e.g., subject to monitoring or to caller location determination); where cellular service is not permitted (e.g., around sensitive electronic systems in airplanes and hospitals); or where cellular service is outright blocked (e.g., jammed or disrupted by high sunspot activity). While telephones 12 with radio frequency based subscriber-side channels 108, e.g., Bluetooth, WiFi, and ZigBee, may be subject to similar concerns, telephones 12 with other types of subscriber-side channels 108, 208 can serve, e.g., USB and analog speaker-microphone cable.

Additionally, a suitable telephone 12 and the telephone interface 100, 200 can permit communications when cellular service is fully available or its presence is simply not a consideration. For instance, an old cell phone 12*d* can be plugged into a POTS/PSTN RJ-11 jack (via the telephone interface 100, 200) and used as if it were a POTS/PSTN device rather than a cellular one.

There has been a growing trend of people "turning off" their subscriber-end POTS/PSTN service and questioning the cost of its installation and maintenance in new construction. The telephone interface 100, 200 provides incentive based ways to at least slow this trend. Telephone service provider companies (TelCos) can keep POTS/PSTN phone lines installed but allow people to use cell phones in their homes or offices, potentially at a lower overall cost to the providers or the customers. Manufacturers can modify PBXs to allow cell phones 12*d* to operate through PBX systems, allowing cellular service providers and manufacturers to partner up with PBX manufacturers to allow the use of advance features in the telephone 12 as part of the PBX system. TelCos that provide POTS/PSTN but not cellular service especially have an incentive here, to have users keep existing POTS/PSTN live (subscribed to) and to install POTS/PSTN in new construction. Similarly, government entities have incentives here, to ensure there is telecommunications redundancy and to retain its existing levels of design and regulatory control.

Companies that provide non-telecommunications services also can have potential incentives here. For example, when there are device-area considerations. Without limitation, hotels, hospitals, alarm companies, and airports and airlines (in waiting and arrival areas, and on board aircraft) can benefit by providing their customers with telecommunications access via the customer's own telephones 12. Hotels and hospitals are expected to provide telecommunications access, yet the conventional telephones they provide get little used and are costly to maintain. The same is the case for telephone handsets provided at every seat in passenger aircraft.

Airports are expected to provide pay-phones for the use of newly arrived travelers, but this particularly is costly as well as a source of customer service issues. As with most pay-phones, those in airports are subject to increased user abuse and outright vandalism. Airport pay-phones also have customer culture and payment considerations. Pay-phones with multi-language instructions are more costly, and still cannot address the language needs of every potential user. The features and the manners of usage of pay-phones also varies considerably by country or region. And then there is the matter of payments. In the United States, we are traditionally used to coin operated pay-phones. In some countries, e.g., Argentina, one purchases coin-like tokens at a shop or kiosk and then uses these in pay-phones, and in other countries, e.g., Japan, one purchases pre-paid calling cards from vending machines and all pay-phones accept these (exclusively, no coins of currency notes). In the U.S., airport staff are often asked by foreign visitors where they can buy tokens and phone cards. U.S. airports are also notorious for their lack of foreign exchange kiosks, and businesses at U.S. airports are almost as notorious for their rude responses to requests for coin change.

All of the above parade of horribles, as well as many others, can be avoided by businesses that provide telephone interfaces 100, 200. First, only the subscriber-side port 106, 206 of the telephone interface 100, 200 needs to be exposed, say as a conventional USB port or speaker-microphone jack, thus reducing the potential for damage and vandalism. In fact, if a subscriber-side channel 108 uses Bluetooth, WiFi, or ZigBee, nothing need be exposed. Second, instruction language and device feature concerns will be greatly reduced when users employ their own telephones 12 (e.g., cell phones, iPad™, etc.) Third, subscriber-provider protocol concerns can largely be eliminated, because the native protocol of the subscriber's telephone 12 (SIM card, CDMA, etc) is not relevant. Bluetooth and WiFi are standardized, and USB and speaker-microphone jacks are close to standardized, so the subscriber-side port 106, 206 of a telephone interface 100, 200 can have sockets for all of the 5-8 most common plug and jack types). Fourth, payment concerns will also be greatly reduced, since users can pay via one of their existing payment mechanisms. If a user uses a prepaid type cell phone 12*d*, the charges can come from the prepaid amount. If a user is invoiced monthly by their cellular service provider, the charges can appear in their next invoice. If a user uses an iPad™ or Android™ tablet as their telephone 12, and if it has payment for services set up (say, for downloading movies or music and charging these to a bank credit or debit card), then telephone charges can simply be included as well. Further, currency exchange transactions can easily be handled automatically, for instance, just as one can use a North American credit card to make purchases in Japan or use a North American debit card to withdraw Euros from ATM machines in Europe. And fifth, we come to user personalization.

Today, we enter huge amounts of data into smart instances of cell phones and other computerized devices. The phonebooks, contacts, and favorites entries in a smart cell phone or a tablet computer are common examples. Similarly, many of us extensively configure devices to better serve our needs and desires. The language of the user interface, particularized ring tones for different individuals or groups, and the uses of and accesses to call and location logging are common examples. Collectively we can term this "personalization."

The telephone interface 100, 200 permits us to significantly apply our personalization of telephones 12 more widely. All one needs to do with a personalization laden telephone 12 is connect it to a telephone interface 100, 200 connected to a POTS/PSTN line, cable company, alarm company, or TelCo PBX (albeit, some of these will require minor modification), and one can employ their personalization. As just a few additional examples, a handicapped person can employ speaker phone features, sound volume or hearing aid interface settings, high contrast or color-blindness minimizing display preferences, etc.

Finally, returning to the example disaster scenarios, and in view of the present inventor's professional involvement in emergency services and management, it should be noted that the inventive telephone interface 100, 200 can especially supplement or easily integrate with key Federal, State, local, and tribal government safety and critical infrastructure reliability programs, both in the United States and with foreign equivalents.

The 2003, 2008, and 2011 power outage examples discussed herein have not gone unnoticed by key officials. In the U.S., the Department of Homeland Security (DHS) as well as others concerned with emergency communications for crisis or emergency, attack and recovery and reconstitution are making substantial and ongoing preparedness efforts. The affects of the 2003 event on the Province of Ontario doubtless has similarly motivated Canada, and the affects of the 2011 event on the State of Baja del Sol doubtless has similarly motivated Mexico.

The U.S. Department of Homeland Security includes the National Communications System (NCS), which has multiple services that the present invention can coexist with or further the goals of. For instance, the NCS operates both the Wireless Priority Service (WPS) and the Government Emergency Telecommunications Service (GETS).

The Wireless Priority Service acknowledges our growing reliance on cellular networks, and that services in these networks can be "problematic" in national security and emergency situations. The WPS therefore provides priority for emergency calls made from some cellular telephones. The present invention supplements this, permitting the use of cell phones and similar devices (e.g., PDAs, tablets, etc.) when cellular service fails entirely.

As its name implies, the Government Emergency Telecommunications Service strives to maintain telecommunications between government entities. One of GETS's key programs is helping to establish Points of Contact (POCs) between government entities at all levels. Returning briefly to our hypothetical paramedic example, the regional disaster management center there is an example of such a POC and the ability of the paramedic to reach it with her personal cell phone 12*d* in the hypothetical disaster scenario there illustrates how the inventive telephone interface 100, 200 can significantly further the goals of GETS.

In addition to furthering national efforts, however, the telephone interface 100, 200 can assist in local efforts. Police and fire call boxes, blue tower/emergency phones, and even roadside emergency call boxes all can work with or be easily converted to work with the inventive telephone interface 100, 200.

For the above, and other, reasons, it is expected that the telephone interface 100, 200 of the present invention will have widespread industrial applicability and it is therefore expected that the commercial utility of the present invention will be extensive and long lasting.

What is claimed is:

1. An apparatus (100, 200) for interfacing a telephone (12) with a telecommunications network (24), wherein the apparatus is external to both of the telephone and the telecommunications network, and wherein the telephone provides and accepts subscriber-side signals (126, 216) and the telecommunications network provides and accepts provider-side signals (132), the subscriber-side signals include subscriber-side control content (128, 218) and subscriber-side voice content (130, 220), and the provider-side signals include provider-side control content (134) and provider-side voice content (136), the apparatus comprising:

a control circuit (150), wherein said control circuit (150) is not a personal computer;

a first port (110) that communicates the subscriber-side signals with said control circuit;

a second port (116) that communicates the provider-side signals with said control circuit;

said control circuit converts the subscriber-side control content to the provider-side control content, and converts the provider-side control content to the subscriber-side control content; and said control circuit converts the subscriber-side voice content to the provider-side voice content, and converts the provider-side voice content to the subscriber-side voice content.

2. The apparatus of claim 1, wherein:

the subscriber-side signals are subscriber-side digital signals (128, 130) and said first port communicates said subscriber-side digital signals.

3. The apparatus of claim 1, wherein the subscriber-side signals are subscriber-side analog signals (218, 220) and said first port communicates said subscriber-side analog signals.

4. The apparatus of claim 1, wherein the provider-side signals are provider-side analog signals (134, 136) and said second port communicates said provider-side analog signals.

5. The apparatus of claim 4, wherein the provider-side control content includes provider-side control content in a conventional telephonic single-tone and dual-tone protocol.

6. The apparatus of claim 1, wherein said first port inter communicates between the telephone and the apparatus using a member of the set of protocols consisting of universal serial bus (USB), WiFi, ZigBee, and Near Field Communications (NFC).

7. The apparatus of claim 1, further comprising a subscriber-side conversion circuit (152, 224) that converts the subscriber-side signals communicated with the telephone to be process able by said control circuit.

8. The apparatus of claim 1, further comprising an provider-side conversion circuit (154, 226) that converts the provider-side signals communicated with the telecommunications network to be process able by said control circuit.

9. The apparatus of claim 1, further comprising a power source (156, 228) to power at least said control circuit of the apparatus.

10. The apparatus of claim 1, further comprising a user control (158) to accept user input to said control circuit.

11. The apparatus of claim 1, further comprising an application logic (162) to programmatically direct operation of said control circuit.

12. The apparatus of claim 11, wherein said application logic directs said control circuit to include in the provider-side control content a telephone number pre-stored in the apparatus before receiving a current instance of the subscriber-side control content.

13. A method (300, 400) for interfacing a telephone (12) with a telecommunications network (24), wherein the telephone provides and accepts subscriber-side signals (126, 216) and the telecommunications network provides and accepts provider-side signals (132), the subscriber-side signals include subscriber-side control content (128, 218) and subscriber-side voice content (130, 220), and the provider-side signals include provider-side control content (134) and provider-side voice content (136), the method comprising:

(a) providing a control circuit (150) external to the telephone and the telecommunications network, wherein said control circuit (150) is not a personal computer;

(b) communicating the subscriber-side signals with said control circuit;

(c) communicating the provider-side signals with said control circuit;

(d) in said control circuit, converting the subscriber-side control content to the provider-side control content, and converting the provider-side control content to the subscriber-side control content; and (e) in said control circuit, converting the subscriber-side voice content to the provider-side voice content, and converting the provider-side voice content to the subscriber-side voice content.

14. The method of claim 13, wherein:

the provider-side signals are provider-side analog signals (134, 136) and said (c) includes communicating said provider-side analog signals with said control circuit; and the subscriber-side signals are subscriber-side digital signals (128, 130) and said (b) includes communicating said subscriber-side digital signals with said control circuit.

15. The method of claim 13, wherein:

the provider-side signals are provider-side analog signals (134, 136) and said (c) includes communicating said provider-side analog signals with said control circuit; and the subscriber-side signals are subscriber-side analog signals (218, 220) and said (b) includes communicating said subscriber-side analog signals with said control circuit.

16. The method of claim 15, wherein said provider-side analog signals include provider-side control content (134) and said provider-side control content in a conventional telephonic single-tone and dual-tone protocol.

17. The method of claim 13, further comprising converting the subscriber-side signals communicated with the telephone to be process able by said control circuit.

18. The method of claim 13, further comprising converting the provider-side signals communicated with the telecommunications network to be process able by said control circuit.

19. The method of claim 13, further comprising directing said control circuit to include in the provider-side control content a telephone number pre-stored before receiving a current instance of the subscriber-side control content.

20. An apparatus (100, 200) for interfacing a telephone (12) with a telecommunications network (24), wherein the apparatus is external to both of the telephone and the telecommunications network, and wherein the telephone provides and accepts subscriber-side signals (126, 216) and the telecommunications network provides and accepts provider-side signals (132), the subscriber-side signals include subscriber-side control content (128, 218) and subscriber-side voice content (130, 220), and the provider-side signals include provider-side control content (134) and provider-side voice content (136), the apparatus comprising:

control means (150), wherein said control means (150) is not a personal computer;

first portal means (110) for communicating the subscriber-side signals with said control means;

second portal means (116) for communicating the provider-side signals with said said control means;

said control means for converting the subscriber-side control content to the provider-side control content, and converting the provider-side control content to the subscriber-side control content; and said control means further for converting the subscriber-side voice content to the provider-side voice content, and converting the provider-side voice content to the subscriber-side voice content.

* * * * *